United States Patent [19]
Kastan

[11] 4,358,967
[45] Nov. 16, 1982

[54] FOOT OPERATED CRANK ASSEMBLY

[76] Inventor: B. Linn Kastan, 624 Primrose Lane, Thousand Oaks, Calif. 91360

[21] Appl. No.: 161,909

[22] Filed: Jun. 23, 1980

[51] Int. Cl.³ .............................................. G05G 1/14
[52] U.S. Cl. .................................. 74/594.2; 74/594.1; 308/192; 308/197
[58] Field of Search ........................... 74/594.1, 594.2; 308/192, 197

[56] References Cited

U.S. PATENT DOCUMENTS

| | | | |
|---|---|---|---|
| 96,648 | 11/1869 | Young | 74/594.1 X |
| 219,551 | 9/1879 | Will et al. | 74/594.1 X |
| 626,227 | 6/1899 | Gaylor | 74/594.1 UX |
| 913,786 | 3/1909 | VanWie | 74/594.1 |
| 950,197 | 2/1910 | Walters | 74/594.1 X |
| 3,551,004 | 12/1970 | Quisenberry | 74/594.1 X |
| 3,578,829 | 5/1971 | Hata et al. | 74/594.1 X |
| 3,835,729 | 9/1974 | Tarutani | 74/594.2 X |
| 3,903,754 | 9/1975 | Morroni | 74/594.1 |
| 3,919,898 | 11/1975 | Sugino | 308/192 |
| 4,300,411 | 11/1981 | Segawa | 74/594.2 |

FOREIGN PATENT DOCUMENTS

| | | | |
|---|---|---|---|
| 1405 | 5/1900 | Austria | 74/594.1 |
| 106166 | 11/1899 | Fed. Rep. of Germany | 74/594.1 |
| 2646698 | 4/1977 | Fed. Rep. of Germany | 74/594.1 |
| 368,844 | 8/1906 | France | 74/594.1 |

*Primary Examiner*—Kenneth Dorner
*Assistant Examiner*—Charles M. Wall
*Attorney, Agent, or Firm*—Jack C. Munro

[57] ABSTRACT

A power transmitting device for a bicycle in the form of a crank which is mounted within a hub housing fixedly secured within the frame of a bicycle. A shaft is rotatably supported within the hub housing with a crank arm being attached to each end of the shaft through a spline connection. A sprocket wheel is mounted between one of the crank arms and the hub housing. The sprocket wheel is fixedly secured to this crank arm.

3 Claims, 3 Drawing Figures

FOOT OPERATED CRANK ASSEMBLY

BACKGROUND OF THE INVENTION

The field of this invention relates to bicycles and more particularly to a power transmitting crank assembly which is commonly employed in conjunction with bicycles in order to transmit motive power from the legs of the user of the bicycle to the rear wheel of the bicycle.

The use of foot operated crank assemblies within bicycles is well known. In recent years, there has been developing a new sport which amounts to racing of dirt bicycles. A dirt bicycle has a wheel diameter of approximately twenty inches. This size of wheel is desirable when racing on dirt tracks, as opposed to racing on streets. The street bicycle will use a substantially larger diameter wheel.

In the racing of bicycles on dirt, the bicycle is frequently subjected to unexpected forces. These unexpected forces have to do with the uneven terrain. Additionally, the operator of the bicycle is constantly subjecting a substantial amount of torque to the foot operated crank assembly of the bicycle. This level of torque may be sufficient, after a few races, to damage the crank assembly requiring replacement.

Also, in the racing of bicycles, if a sprocket wheel, or other portion of the crank assembly of the bicycle, becomes damaged, it would be desirable to facilitate quick replacement of that part thereby permitting the participant to continue in the race. Additionally, in the short period of time between races, it may be desirable, because of different racing conditions, to change from one size sprocket wheel to another size sprocket wheel. Again, quick replacement of the sprocket wheel would be desirable.

Within prior art bicycles, the quick replacement of the sprocket wheel has not been possible. Therefore, if any portion of the crank assembly becomes damaged, the participant is forced to withdraw from the race. Additionally, the changing of any sprocket, or any portion of the crank assembly between races has heretofore not been feasible, as usually insufficient time is permitted.

SUMMARY OF THE INVENTION

The bicycle crank assembly of this invention is mounted within a hub housing which is formed within the frame of the bicycle. A shaft is rotatably, low-frictionally, mounted within the hub housing. A tubular, tapered crank arm is attached through a spline connection at each end of the shaft. Formed on the exterior surface of the shaft are two, spaced-apart, threaded sections where the diameter of one of the threaded sections is slightly larger than the other threaded section. A collar is to be threadably engaged with the larger threaded section and in contact with an annular shoulder formed on the shaft at the outer end of the larger threaded section. The collar extends a slight distance outwardly past an end of the hub. A sprocket wheel is to be placed over the shaft in abutting contact with the collar. One of the crank arms is located in contact with the exterior surface of the sprocket wheel. The sprocket wheel is fixedly secured by appropriate fastening means to this crank arm. The longitudinal center axis of each of the crank arms are parallel and are outwardly slanted away from perpendicular with respect to the longitudinal center axis of the shaft. A single bolt fastener is associated with each crank arm to secure in position the crank arm with respect to the shaft.

The primary objective of this invention is to construct a bicycle crank assembly that is capable of taking a substantial amount of abuse over an extended period of time without requiring repair or replacement.

A further objective of this invention is to construct a bicycle crank assembly which can be quickly and easily removed and replaced.

BRIEF DESCRIPTION OF THE DRAWING

FIG. 3 is a longitudinal cross-sectional view of the bicycle crank assembly of this invention in its assembled state.

DETAILED DESCRIPTION OF THE SHOWN EMBODIMENT

Figure 1:
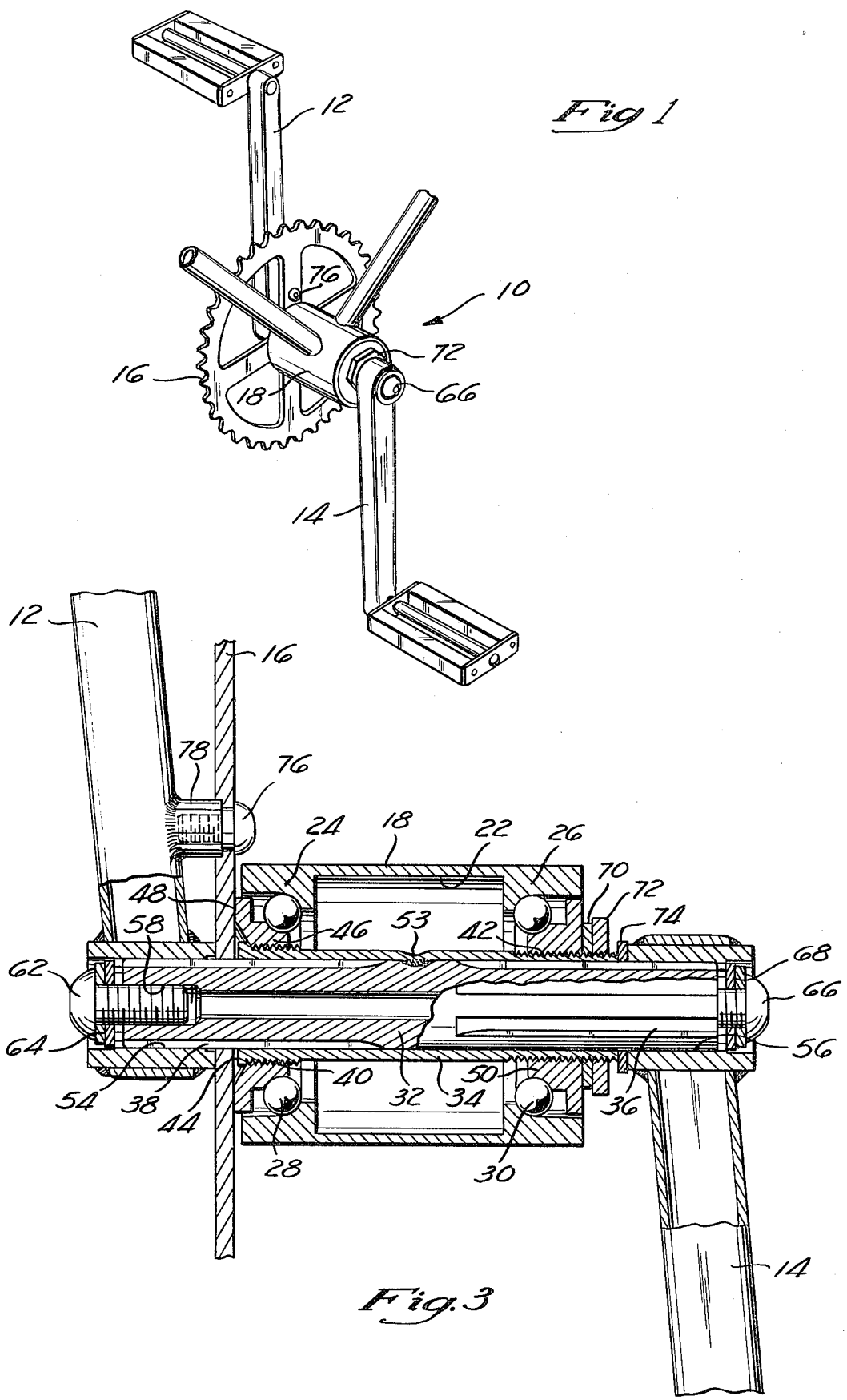
FIG. 1 is an overall perspective view of the bicycle crank assembly of this invention.
Figure 2:
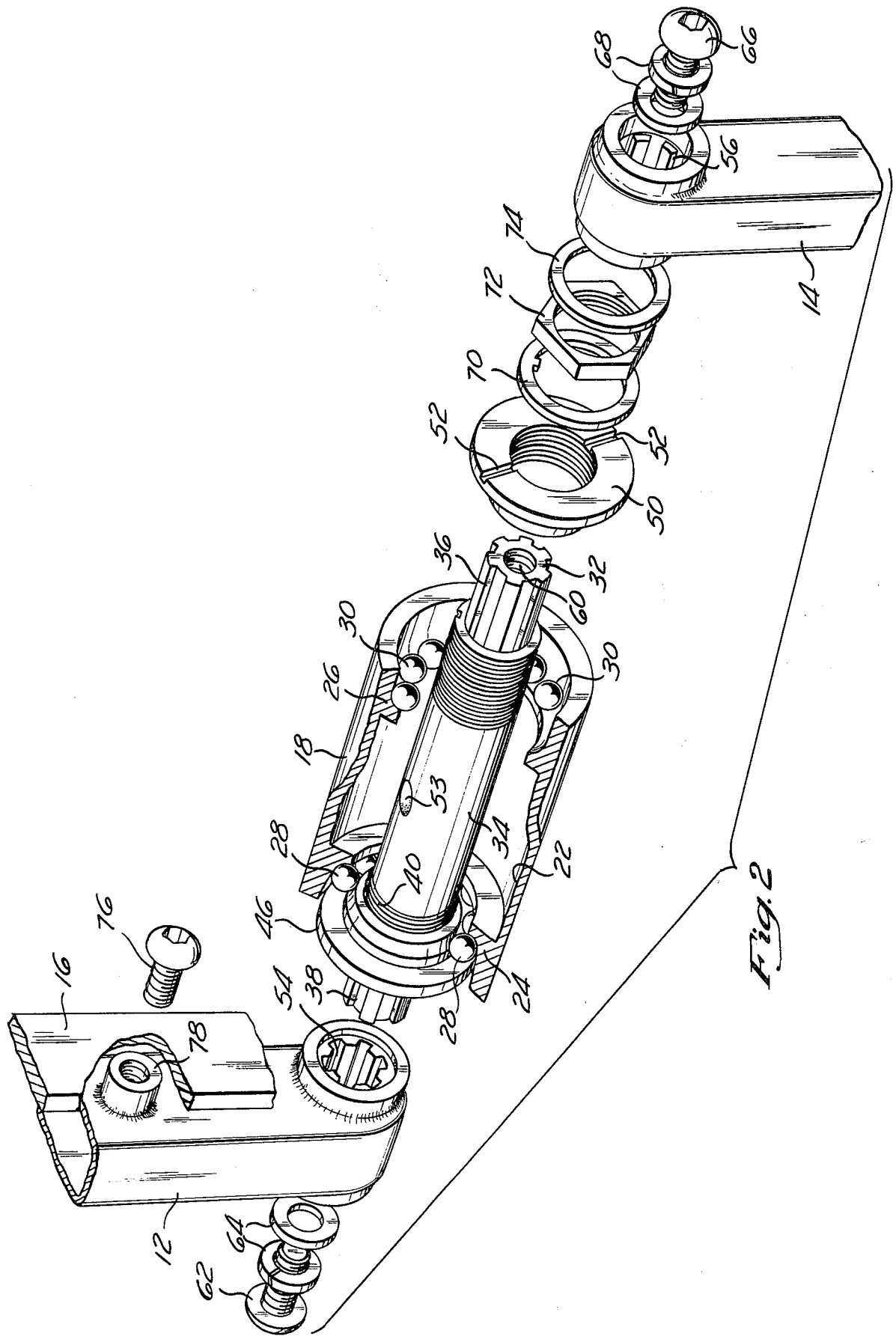
FIG. 2 is an exploded, partly in cross-section, perspective view of the hub section within the bicycle crank assembly of this invention.

Referring particularly to the drawing, there is shown in FIG. 1 the bicycle crank assembly 10 which is composed generally of a first crank arm 12, a second crank arm 14, a sprocket wheel 16 and a hub housing 18. The hub housing 18 is formed as part of the frame 20 of the bicycle and is deemed to be conventional and forms no specific part of this invention.

The hub housing is tubular and has an internal chamber 22. Integrally formed with the hub housing 18 and located within the internal chamber 22 are bearing races 24 and 26. Race 25 is to be in continuous contact with a first series of ball bearings 28 and the race 26 is to be in continuous contact with a series of ball bearings 30.

Extending entirely through the chamber 22 and protruding from each end of the hub housing 18 is a shaft assembly which takes the form of a shaft 32 and a sleeve 34. Formed upon each end of the shaft 32 are splines 36 and 38. The length of the splines 36 and 38 are such that they terminate substantially directly adjacent the longitudinal center of the shaft 32. It is to be noted that each of the splines 36 and 38 are of uniform cross-section.

It has been known to taper the connection between the crank arm and the shaft. The material of construction of the crank arm is softer than the material of the shaft. The connection opening in the crank arm is polygonal in cross-section. During continued usage, this opening tends to wear by enlarging. Finally, the crank arm cannot be tightened on the shaft and must be replaced.

Sleeve 34 has formed on the exterior surface thereof threaded sections 40 and 42. The threaded section 40 is slightly larger in diameter than threaded section 42. The outer end of the threaded section 40 terminates in an enlarged annular shoulder 44.

In the assemblage of the crank assembly 10 of this invention, a collar 46 is slipped over the threaded section 42 and moved to engage threaded section 40. The collar 46 is then tightened until such abuts shoulder 44, as shown within FIG. 3 of the drawing. The outer face 48 of the collar 46 is to protrude slightly exteriorly of the edge of the housing 18, as also is shown within FIG. 3. The reason for this is so that sprocket wheel 16 will engage the face 46 (which rotates) and not engage the edge of the fixed housing 18. Engagement between the housing 18 and the sprocket wheel 16 will prevent free rotation of the sprocket wheel 16.

The inner surface of the collar 46 is formed to include a bearing race so as to accommodate the bearings 28. A second collar 50 has an inner surface which is also a bearing race. Second collar 50 is to be threadably engaged with threaded section 42 and accommodate bearings 30. The outer face of the collar 50 includes keyway slots 52, one of which is to accommodate a key (not shown) which is to engage the keyway slot 54 formed within the threaded section 42. As a result, the shaft assembly is low frictionally supported with respect to the housing 18.

The shaft assembly is assembled by the sleeve 34 being slid over the shaft 32 until the proper position is achieved. It is to be noted that this proper position is such that there is a greater amount of shaft extending outwardly from the shoulder 44 than the opposite end of the shaft 32. The reason for this is that the greater distance of shaft at this end is necessary to accommodate the width of the sprocket wheel 16.

The sleeve 34, once in the desired position, is physically connected to the shaft 32 by tacking at area 53 so as to deform tightly into contact with the shaft 32. This deforming of the area 52 is principally only for the purpose of achieving a temporary tight connection between shaft 32 and sleeve 34. The principal securing is achieved by brazing—that is, the pouring of molten metal into the slight space between the shaft 32 and the inner surface of the sleeve 34. This slight space is purposely created so as to facilitate slipping of the sleeve 34 over the shaft 32 and also to facilitate the brazing process. The length of the splines 36 and 38 are purposely extended into this brazing area to strengthen the brazing connection. As a result, the shaft assembly formed of the sleeve 34 and the shaft 32 is extremely strong and capable of withstanding a substantial amount of torque over an extended period of time.

A spline engaging opening 54 is formed within the inner end of the arm 12. The opening 54 is to engage in a close fitting manner with the splines 38. A similar spline engaging opening 56 is formed within the inner end of the arm 14 and is adapted to engage in a close fitting manner with the spline section 36. Also formed within the shaft 32 are internally threaded sections 58 and 60. A conventional bolt fastener 62 is employed in conjunction with the washer assembly 64 to engage with the threaded section 58 to thereby tightly position the arm 12 onto the splines 38. A similar fastener 66 is employed in conjunction with a washer assembly 68 to engage with the threaded section 60 to tightly hold in position the arm 14 onto the splines 36. Located between the arm 14 and the second collar 50 about the spline 36 is a washer 70 and a lock nut 72. A spacer 74 is located between the sleeve 34 and the arm 14.

A chain is to engage with the periphery of the sprocket wheel 16. Because there will be a substantial amount of torgue created from the shaft 32 and the chain on the sprocket wheel 16, it is desired to securely connect the sprocket wheel 16 to the arm 12. This is accomplished through the use of a conventional fastener 76, which is conducted through an appropriate hole formed within the sprocket wheel 16 which thereupon engages a threaded boss 78 formed on the arm 12.

Since the crank assembly 10 of this invention is designed primarily to be employed on racing bicycles. It is desirable that each part to be constructed as strong as possible and of the least weight in order to minimize the overall weight of the bicycle. For this purpose, each of the crank arms 12 and 14 are specially constructed of sheet metal and of tubular construction. Also, the outer end of each of the arms 12 and 14, with respect to their inner end, are smaller, which means that the arms 12 and 14 are outwardly tapered. This tapering is not only desirable from an appearance point of view, but also from a strength point of view, and further to eliminate unnecessary material of construction.

Additionally, by referring to FIG. 3, it can be seen that the longitudinal center axis of both the arms 12 and 14 is slanted away from perpendicular with respect to the longitudinal center axis of the shaft 32. This is desirable so that the outer end of each of the crank arms 12 and 14 are spaced a short distance away from the frame of the bicycle. This spacing is desirable so that the user's feet will operate the pedals, which are attached to the outer ends of the crank arms 12 and 14, and not have a tendency to encounter the frame of the bicycle. It is to be noted that the longitudinal center axes of the arms 12 and 14 are parallel.

What is claimed is:

1. A foot operated crank assembly for transmitting power to a bicycle comprising:

a hub housing adapted to be fixedly secured to the frame of a bicycle, sand hub housing having an inner end and an outer end;

a shaft assembly having a first longitudinal center axis, said shaft assembly extending through said hub housing and exteriorly of both said inner end and said outer end, said shaft assembly being supported for low frictional rotation in respect to said hub housing, the axis of rotation of said shaft assembly coinciding with said first longitudinal center axis;

a collar secured in a predetermined position upon said shaft assembly, said collar having an outer face, said outer face being located exteriorly of said inner end;

a sprocket wheel mounted on said shaft assembly against said outer face of said collar, said sprocket wheel being adapted to connect with a chain, said sprocket wheel being fixed relative to said shaft assembly;

a first tubular crank arm being fixed to said shaft assembly directly adjacent said inner end, a second tubular crank arm being fixed to said shaft assembly directly adjacent said outer end;

said shaft assembly having first and second screw thread sections formed on the exterior surface of said shaft assembly, the diameter of said first screw thread section being larger than the diameter of said second screw thread section, a shoulder secured to said shaft assembly at the end of said shaft assembly directly connecting with said first screw thread section, said shoulder being of a larger diameter than said diameter of said first screw thread section, said collar to be located about said shaft assembly and then slid by said second screw thread section to engage with said first screw thread section, at complete engagement of said collar with said first said screw thread section, said collar abuts said shoulder; and wherein said shaft assembly comprises a cylindrically shaped shaft upon which is located a sleeve having a length less than said shaft, said sleeve being secured to said shaft by securing means, said first and second screw thread sections being formed on said sleeve.

2. The foot operated crank assembly as defined in claim 1 wherein:
each end of said shaft assembly including a spline connection, each said spline connection including a plurality of spaced apart elongated grooves, a portion of each said spline connection to be located between said sleeve and said shaft, said securing means connecting said portion of each said spline connection to said shaft.

3. The foot operated crank assembly as defined in claim 2 wherein:
said securing means comprising brazing.

* * * * *